United States Patent
Ueno et al.

(10) Patent No.: US 8,502,905 B2
(45) Date of Patent: Aug. 6, 2013

(54) SOLID-STATE IMAGING DEVICE

(75) Inventors: Risako Ueno, Tokyo (JP); Hideyuki Funaki, Tokyo (JP); Mitsuyoshi Kobayashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 13/039,504

(22) Filed: Mar. 3, 2011

(65) Prior Publication Data

US 2012/0062771 A1    Mar. 15, 2012

(30) Foreign Application Priority Data

Sep. 14, 2010   (JP) ................... 2010-205638

(51) Int. Cl.
  *H04N 5/225*   (2006.01)
  *G02B 13/16*   (2006.01)
(52) U.S. Cl.
  USPC .......... 348/335; 348/340; 348/345; 348/348; 348/349; 348/352
(58) Field of Classification Search
  USPC ............. 348/335, 340, 345, 348, 349, 352; 396/71–73
  See application file for complete search history.

(56) References Cited

U.S. PATENT DOCUMENTS

| | | | |
|---|---|---|---|
| 4,023,189 A * | 5/1977 | Govignon | 396/18 |
| 6,480,679 B1 * | 11/2002 | Ishida et al. | 396/164 |
| 2007/0014019 A1 | 1/2007 | Mouli | |
| 2007/0040828 A1 | 2/2007 | Zalevsky et al. | |
| 2008/0142681 A1 | 6/2008 | Takizawa et al. | |
| 2009/0027542 A1 | 1/2009 | Yamamoto et al. | |
| 2009/0128658 A1 | 5/2009 | Hayasaka et al. | |
| 2010/0066823 A1 | 3/2010 | Westphal et al. | |
| 2010/0141802 A1 | 6/2010 | Knight et al. | |
| 2010/0283884 A1 | 11/2010 | Hayasaka et al. | |
| 2012/0050589 A1 | 3/2012 | Ueno et al. | |
| 2012/0057020 A1 | 3/2012 | Kobayashi et al. | |

FOREIGN PATENT DOCUMENTS

| | | |
|---|---|---|
| JP | 2004-179736 | 6/2004 |
| JP | 2009-165115 | 7/2009 |
| JP | 2010-002233 | 1/2010 |
| JP | 2010-067624 | 3/2010 |

OTHER PUBLICATIONS

Ng et al, Light Field Photography with a Hand-held Plenoptic Camera, Stanford Tech Report, CTSR Feb. 2005.
Japanese Office Action for Japanese Application No. 2010-205638 mailed on Jul. 13, 2012.
Office Action for U.S. Appl. No. 13/039,508 Dated Apr. 26, 2013.

* cited by examiner

*Primary Examiner* — Yogesh Aggarwal
(74) *Attorney, Agent, or Firm* — Turocy & Watson, LLP

(57) ABSTRACT

In one embodiment, a solid-state imaging device includes: an imaging optical system including: a first and second surfaces facing each other; a flat reflector provided on the first surface and having an aperture in an outer circumferential portion; and a plurality of reflectors provided on the second surface and located in a plurality of ring-like areas, each of the reflectors being inclined in a radial direction, the reflectors having different diameters from one another; and an imaging element module including: an imaging element including an imaging area having a plurality of pixel blocks each including a plurality of pixels, and receiving and converting light from the imaging optical system into image data; a visible light transmission substrate provided between the imaging optical system and the imaging element; a microlens array provided on a surface of the visible light transmission substrate on the imaging element side; and an image processing unit processing the image data obtained by the imaging element.

8 Claims, 9 Drawing Sheets

SOLID-STATE IMAGING DEVICE

CROSS-REFERENCE TO RELATED APPLICATION

This application is based upon and claims the benefit of priority from prior Japanese Patent Application No. 2010-205638 filed on Sep. 14, 2010 in Japan, the entire contents of which are incorporated herein by reference.

FIELD

Embodiments described herein relate generally to a solid-state imaging device that acquires a visible image and range information at the same time.

BACKGROUND

As imaging techniques for obtaining a depth-direction distance as two-dimensional array information, various methods are being developed, such as a technique utilizing reference light and a stereo distance measurement technique utilizing more than one camera. Particularly, there is an increasing demand for relatively inexpensive products as novel input devices for consumer use in recent years.

An imaging device utilizing microlenses has been known as a technique for obtaining a range image in an indirect manner. This device includes an imaging optical system, an imaging element, and a microlens array having microlenses between the imaging optical system and the imaging element. Light beams that are guided through an area in the lens aperture stop from the same subject point by the imaging optical system and form an image near the surface of the microlens array are redistributed to the pixel areas of the imaging element by the microlenses. The distribution of incident light beams is realized by the differences in incident angle with respect to the microlenses, and the differences in incident angle with respect to the microlenses reflect the range information. Therefore, an image that is focused at a desired range can be reconstructed by performing image processing on pixel signals formed by obtaining the distributed light beams at the respective pixels.

Also, since a desired viewpoint image within the aperture width of the imaging lens can be reconstructed, range image information can be calculated by triangulation from two or more viewpoints. Normally, where the range image information is calculated from arbitrary viewpoints, the range resolution becomes higher in proportion to the focal length of the imaging system and the distance between the viewpoints.

Such an imaging device has a problem that the optical system size and the range resolution is in a trade-off relationship both in the longitudinal direction (the focal length direction) and the lateral direction (the lens aperture direction), and this problem hinders miniaturization of cameras.

DETAILED DESCRIPTION OF THE INVENTION

In one embodiment, a solid-state imaging device includes: an imaging optical system including: a first and second surfaces facing each other; a flat reflector provided on the first surface and having an aperture in an outer circumferential portion, the flat reflector having a circular plate-like shape; and a plurality of reflectors provided on the second surface and located in a plurality of ring-like areas, each of the reflectors being inclined in a radial direction, the reflectors having different diameters from one another, light entering from a subject through the aperture being reflected between the flat reflector and the plurality of reflectors, the light being transmitted toward a center portion, the light forming an image at the center portion; and an imaging element module including: an imaging element comprising an imaging area having a plurality of pixel blocks each including a plurality of pixels, and receiving and converting light from the imaging optical system into image data; a visible light transmission substrate provided between the imaging optical system and the imaging element; a microlens array provided on a surface of the visible light transmission substrate on the imaging element side, and including a plurality of microlenses corresponding to the pixel blocks; and an image processing unit processing the image data obtained by the imaging element. The imaging element module is provided at the center portion of the second surface of the imaging optical system.

The following is a description of embodiments with reference to the accompanying drawings.
(First Embodiment)

Figure 1:
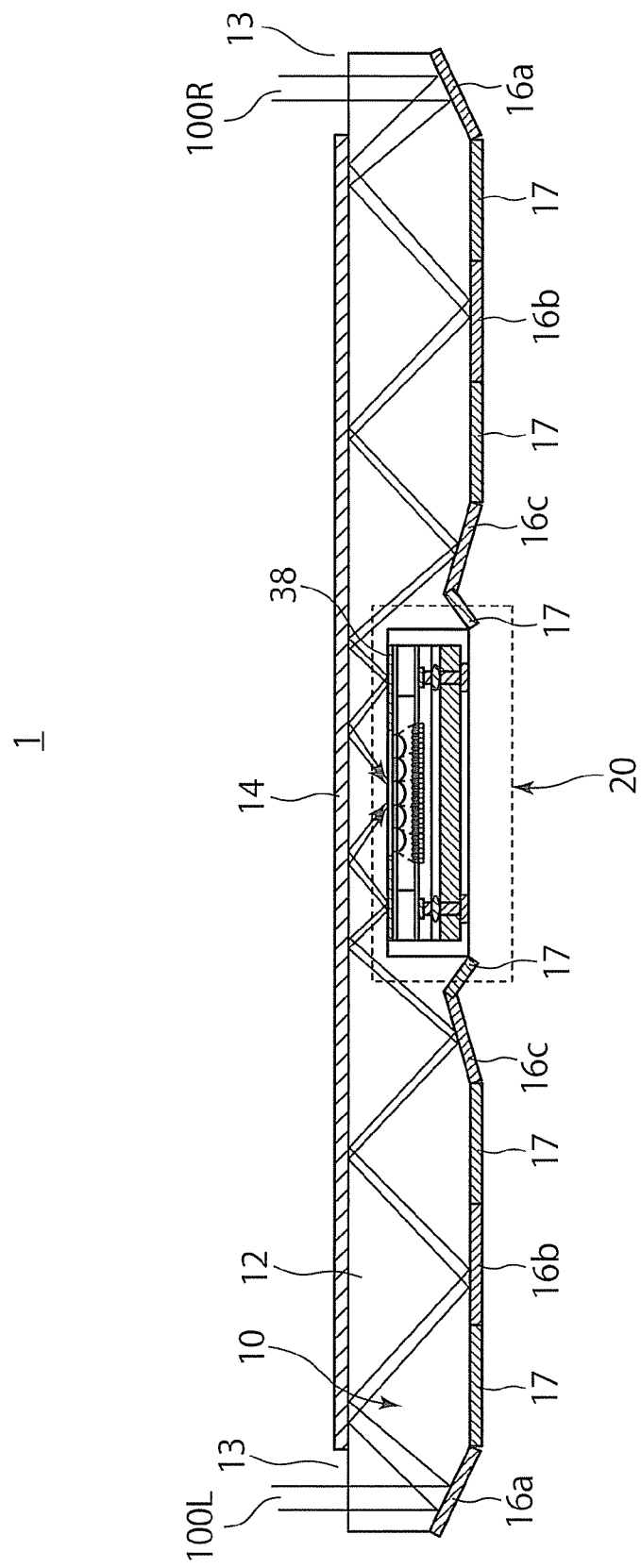
FIG. 1 is a cross-sectional view of a solid-state imaging device of a first embodiment.
Figure 2:
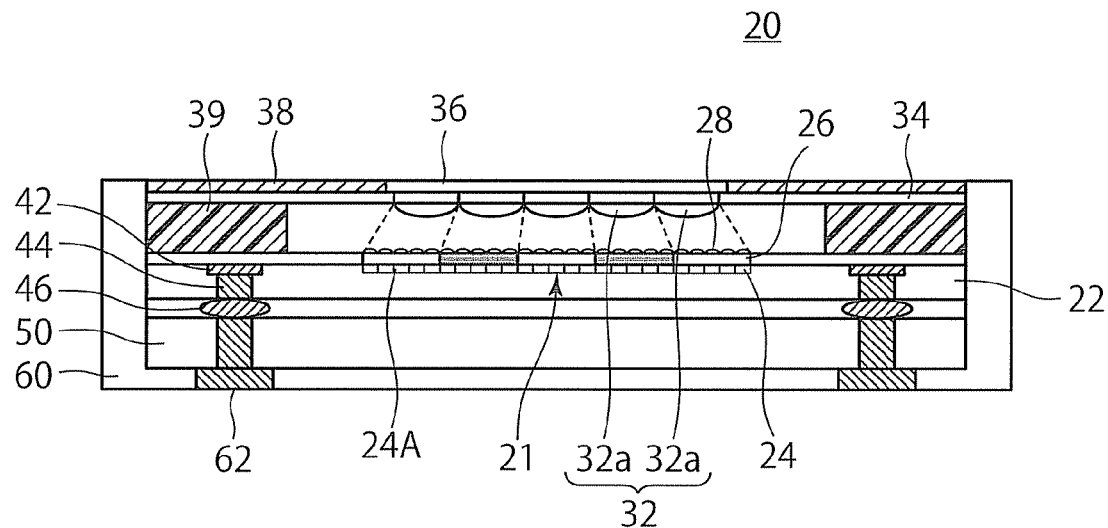
FIG. 2 is a cross-sectional view of an imaging element module of the first embodiment.

FIG. 1 shows a solid-state imaging device according to a first embodiment, and FIG. 2 shows an imaging element module included in the solid-state imaging device.

The solid-state imaging device 1 of the first embodiment includes a first imaging optical system 10 that forms an image of a subject on an imaging surface, and an imaging element module 20.

The first imaging optical system 10 is formed by a reflection-type imaging lens based on a return-reflection-type optical structure. The first imaging optical system 10 is an optical system that gathers light beams 100L and 100R radiated from a single point onto another single point by reflecting the light beams 100L and 100R that are radiated from a subject and enter from left and right portions not with lenses and light refraction in the air but with reflectors having adjusted angles, and transmitting the reflected light beams 100L and 100R through a visible light transmission member. The first imaging optical system 10 includes a visible light transmission member 12 in the form of a circular plate, a flat reflector 14 that is provided on a first surface from which light beams from a subject enter the optical system 10, and reflectors 16a, 16b, and 16*c* (three reflectors in the example shown in the drawing) that are provided on a second surface that is on the opposite side from the first surface.

The flat reflector 14 is provided to cover the first surface of the visible light transmission member 12, except for an outer circumferential area 13. The outer circumferential area 13 of the first surface is a ring-like aperture portion from which the light beams 100L and 100R enter the optical system 10. The reflectors 16*a*, 16*b*, and 16*c* are provided in ring-like areas having different diameters from one another on the second surface of the visible light transmission member 12. The reflectors 16*a*, 16*b*, and 16*c* are tilted radially with respect to the visible light transmission member 12. That is, ring-like grooves that are tilted radially with respect to the visible light transmission member 12 and have different diameters from one another are formed in the second surface of the visible light transmission member 12, and the reflectors 16*a*, 16*b*, and 16*c* are buried in those grooves. Each of the grooves is processed so as to have the same height in the same circumference at an intended angle by a turnery technique, an etching process, or the like. The imaging element module 20 is buried in the center portion of the second surface of the visible light transmission member 12. The second surface of the visible light transmission member 12 is covered with a visible light absorption member 17, except for the areas in which the reflectors 16*a*, 16*b*, and 16*c* are provided, and the area in which the imaging element module 20 is provided. With this structure, the light 100L and 100R that enter the optical system 10 from the aperture portion 13 provided in the first surface are reflected by the reflectors 16*a*, 16*b*, and 16*c*, and the flat reflector 12, and then enter the imaging element module 20 after traveling through the visible light transmission member 12.

The imaging element module 20 includes an imaging element 21 that has pixels 24 including photodiodes formed on a semiconductor substrate 22, and a drive/read-out circuit (not shown) that drives the pixels 24 and reads signals from those pixels 24. On the pixels 24, a color filter 26 is formed for each p×q pixels (p and q being natural numbers) or for each pixel block 24A. The color filters 26 may have a Bayer arrangement of red, green, and blue colors, for example. On the color filters 26, a microlens 28 for pixel light gathering may be formed for each one pixel.

As p×q becomes larger in each pixel block 24A formed by p×q pixels, the number of viewpoints of the light beams becomes larger, and the angular resolution becomes higher. However, if the imaging element 21 has a×b pixels, the total number of microlenses is (a×b)/(p×q). Therefore, the number of pixels (=(a×b)/(p×q)) of the reconstructed two-dimensional image becomes smaller, and the two-dimensional image resolution becomes lower. The range accuracy to be affected by the angular resolution and the two-dimensional image resolution should be appropriately set by respective applications.

A visible light transmission substrate 34 that transmits visible light and has a microlens array 32 that includes microlenses 32*a* is provided above the color filters 26. A transmission layer 36 is formed on the opposite surface of the visible light transmission substrate 34 from the microlens array 32, and a visible light reflection layer 38 is formed around the transmission layer 36. Light beams that enter the imaging element module 20 pass through the transmission layer 36, the visible light transmission substrate 34, the microlens array 32, the microlenses 28, and the color filters 26 before reaching the pixels. The microlens array 32 may be a transparent substrate such as a glass substrate subjected to etching, a transparent substrate on which a transparent substrate is molded and subjected to lens processing, a transparent substrate to which a transparent photosensitive resin is applied and on which lens processing is performed by a photolithography technique followed by a heat treatment, or the like. The visible light reflection layer 38 may be a specular reflective film made of a metal material with a high visible light reflectance, such as aluminum or silver.

The visible light transmission substrate 34 is bonded to the semiconductor substrate 22 by a spacer 39 that is made of a resin material and is provided around the imaging area having the pixels formed therein. The positioning performed when the semiconductor substrate 22 and the visible light transmission substrate 34 are bonded to each other is performed with reference to positioning marks or the like. The visible light transmission substrate 34 may be made of a material that blocks unnecessary infrared rays or may have a film that blocks infrared rays, for example.

Electrode pads 42 for reading the pixels 24 are provided in the semiconductor substrate 22, and through electrodes 44 that penetrate through the semiconductor substrate 22 are formed under the electrode pads 42. The semiconductor substrate 22 is electrically connected to a chip 50 via the through electrodes 44 and bumps 46. The chip 50 includes an image processing circuit that drives the imaging element 21 and processes read-out image data.

A light shielding cover 60 for shielding unnecessary light is provided around the semiconductor substrate 22, the visible light transmission substrate 34, and the chip 50. Module electrodes 62 that electrically connect the chip 50 to the outside are provided in the light shielding cover 60.

In this embodiment, the microlens array 32 is placed at a distance that is equivalent to the focal length of the first imaging optical system 10. The distance between the microlenses 32*a* and the imaging element 21 is equal to the focal length of the microlenses 32*a*.

In this embodiment having the above structure, light that is radiated from a subject and enters from the outer circumference of the first imaging optical system 10 is divided into light beams with parallaxes by the microlenses 32*a*, and enters the pixels 24 in the respective pixel blocks 24A. The pixel signals in the pixel blocks 24A are subjected to image processing in the image processing circuit, to obtain range image information and a visible image.

Figure 3:
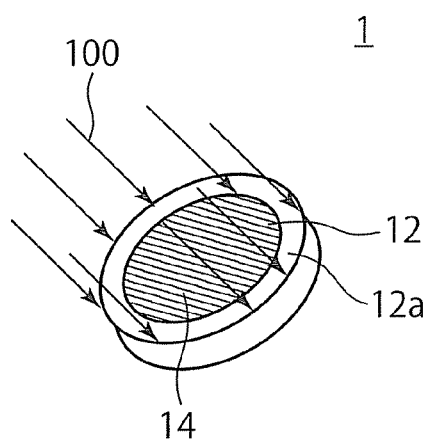
FIG. 3 is a perspective view of the solid-state imaging device of the first embodiment.
Figure 4:
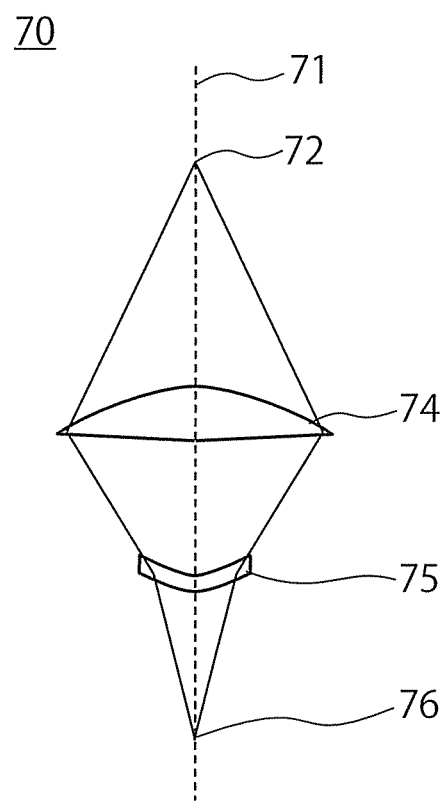
FIG. 4 is a diagram showing a return-reflection-type imaging optical system.

Next, the first imaging optical system 10 is described. First, the return optical lens as the imaging optical system 10 is described. The return optical lens 10 includes the flat reflector 14 on the first surface of the visible light transmission member 12 that has a round shape and a high visible light transmittance, and the reflectors 16*a*, 16*b*, and 16*c* formed on the second surface. As shown in FIG. 3, light enters from the circumferential portion (the apertures) 13 in which the flat reflector 14 is not provided. The light is repeatedly reflected between the flat reflector 14 provided on the first surface and the reflectors 16*a*, 16*b*, and 16*c* provided on the second surface, to reproduce the ray trajectories of refracting imaging lenses made of general glass or the like. For example, there may be an optical system 70 that includes two refracting lenses of a convex lens 74 and a concave lens 75, as shown in FIG. 4. A light beam 73 is radiated from a subject point 72 located on an optical axis 71, and enters the concave lens 75 through the convex lens 74. The light beam 73 forms an image at an imaging point 76. In the case of this optical system 70, the light beam passes through an aperture 77 before entering the convex lens 74, as shown in FIG. 5(*a*).

Figure 5:
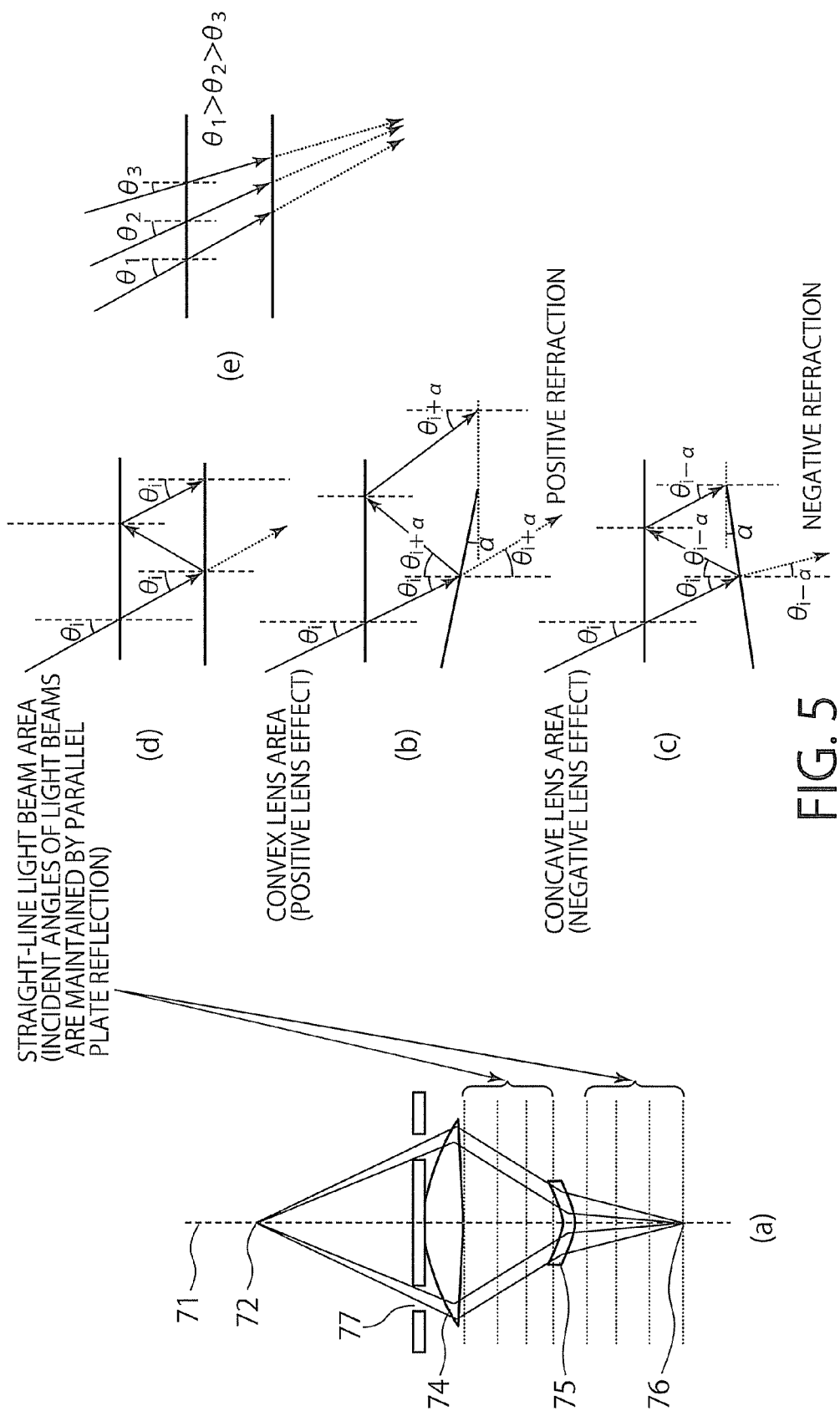
FIGS. 5(a) through 5(e) are diagrams for explaining the return-reflection-type imaging optical system.

The refraction by the convex lens can be reproduced by a reflector 16 that is inclined so that the thickness formed with the flat reflector 14 becomes larger toward the inside of the flat reflector 14, as shown in FIG. 5(*b*).

The refraction by the concave lens can be reproduced by a reflector 16 that is inclined so that the thickness formed with the flat reflector 14 becomes smaller toward the inside of the flat reflector 14, as shown in FIG. 5(*c*).

The straight-line traveling of light beams can be reproduced through reflection by parallel flat reflectors 14 and 16. As for the incident angle $\theta_1$ of a light beam that enters from the outside of the ring-like aperture portion and the incident angle $\theta_3$ of a light beam that enters from the inside of the ring-like aperture portion, the incident angles differ from each other as expressed by $\theta_1 > \theta_3$, as shown in FIG. 5(*e*). However, those angles are maintained by virtue of the reflection by the parallel flat reflectors, as shown in FIG. 5(*d*).

As described above, the ray trajectories of refracting imaging lenses can be reproduced by the flat reflector 14 and the reflectors 16*a*, 16*b*, and 16*c*. As a result, a reflection-type optical system that is thin relative to the focal length, like the first imaging optical system 10 shown in FIG. 1, can be formed.

Since the imaging is performed through reflection in this case, chromatic dispersion of the refractive index, which is a problem with a refracting type, is small. Where the lens matrix and the air differ in refractive index, chromatic aberration is caused when light enters the lens matrix and when light is radiated toward the module. However, the chances of a chromatic aberration are lower than in a case of an optical system that utilizes the refractions at a set of lenses. Accordingly, chromatic aberrations can be restrained. Although the inclined reflectors 16*a*, 16*b*, and 16*c* are formed only on one surface (the first surface) of the visible light transmission member 12, the reflectors may be provided on both surfaces. Further, the inclined reflectors shown in the drawings are flat plates, but the inclined reflectors may have curvature factors so as to effectively correct a chromatic aberration or the like when light enters the lens matrix.

Examples of materials that can be used as the visible light transmission member 12, which is the matrix of the return lens, include glass, synthetic silica, calcium fluoride, optical plastic, and the like. However, the return lens may not have a structure that is filled with the visible light transmission member 12, but may be a structure that has a hollow formed inside, and reflects and transmits light through the hollow with first and second reflectors. As the reflectors 14, 16*a*, 16*b*, and 16*c*, reflective films made of a metal material with a high visible light reflectance, such as silver, aluminum, or stainless steel, can be used.

Next, the optical relationships among the first imaging optical system 10, the microlens array 32, and the imaging element are described.

Figure 6:
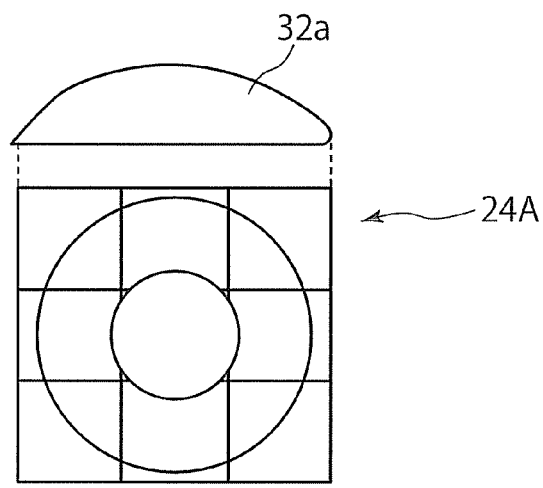
FIG. 6 is a diagram for explaining an image that has passed through a microlens in the first embodiment.

Light from the same subject enters from the outer circumference that is the ring-like aperture portion 13 of the reflection-type imaging lens, and is guided as light beams with parallaxes to the pixels 24 in the corresponding pixel blocks 24A by the respective microlenses 32*a* of the microlens array 32, to the respective areas in each pixel block, dividedly. The distribution of the incident light beams to the pixels 24 is realized by the differences in incident angle with respect to the microlenses 32*a*, and the differences in incident angle with respect to the microlenses 32*a* reflect the range information. The light intensity distribution formed in each pixel block 24A exhibits a shape similar to the ring-like aperture, as shown in FIG. 6.

Next, a method of estimating a distance from parallax images is described.

In the following, a method of acquiring range image information and a visible image by performing image processing on the pixel signals in one pixel block 24A is described.

Figure 7:
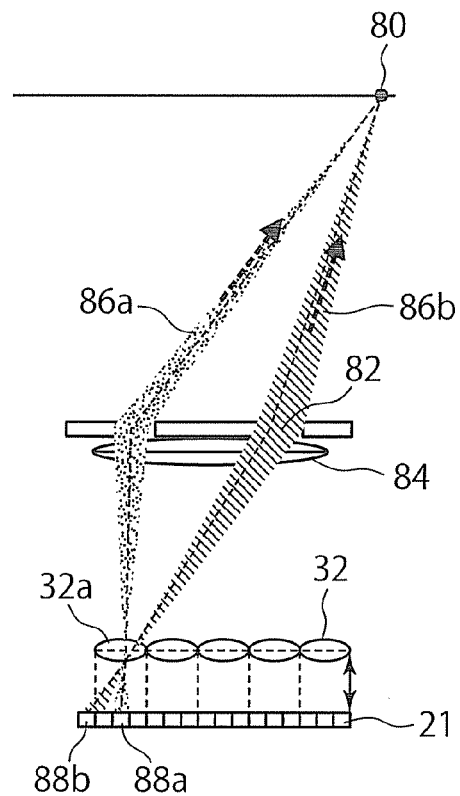
FIG. 7 is a diagram for explaining a method of estimating a distance from parallax images in the first embodiment.

The light intensity distribution formed in the pixel block 24A by the distributed light beams is acquired by each pixel. For example, as shown in FIG. 7, light beams from a subject 80 that enter from both sides of a ring-like aperture 82 are light beams 86*a* and 86*b* from a first viewpoint and a second viewpoint, respectively. The incident angles of the light beams 86*a* and 86*b* with respect to an imaging optical system 84 vary with the distance, or the light beams 86*a* and 86*b* have parallaxes. As shown in FIG. 7, the light beams 86*a* and 86*b* of the first and second viewpoints are gathered onto one spot by the imaging optical system 84. After the gathering, however, the light beams are redistributed into the corresponding pixel blocks 24A by a microlens 32*a* of the microlens array 32, and form a first viewpoint image 88*a* and a second viewpoint image 88*b*. In this manner, the light beams from the first viewpoint and the second viewpoint can be separated from each other.

The light beam intensity pixel signals of the images of the respective viewpoints are extracted for each microlens (or for each pixel block), and the images are combined and subjected to image processing. In this manner, an image that is focused at a desired range can be reconstructed. Since an image of any viewpoint within the aperture width of the imaging lens can be reconstructed, range image information can be calculated by triangulation from two or more viewpoints. Normally, where the range image information is calculated from arbitrary viewpoints, the range resolution becomes higher in proportion to the focal length of the imaging system and the distance between the viewpoints.

Next, the accuracy of estimation of distances from parallax images is described.

Normally, where the range image information is calculated from two or more viewpoints, the range resolution becomes higher in proportion to the focal length of the imaging system and the distances between the viewpoints.

Between two cameras (a right-side viewpoint camera (r) and a left-side viewpoint camera (L)), the distance Z is determined by stereo matching according to the following equation (1):

$$Z = \frac{fB}{(x^l - x^r)} \quad (1)$$

where f represents the focal length of the imaging lens, B represents the distance between the cameras (the viewpoints), $x^l$ and $x^r$ represent the coordinates of the same subject detected by the respective cameras (the viewpoints), and $x^l - x^r$ represents the difference in parallax.

The range resolution $\Delta Z$ is determined according to the equation (2):

$$|\Delta Z| = \frac{Z^2}{Bf} |\Delta d| \quad (2)$$

where $\Delta d$ is the smallest detectable parallax. For example, in a case where a matching search is performed for each pixel, $\Delta d$ is equal to [the pixel size×¼], if a 1-pixel or sub-pixel search is performed and the matching accuracy is as high as ¼ of a pixel. As the focal length f becomes smaller, the accuracy becomes poorer. Also, as the distance between the viewpoints (the cameras) becomes longer, the accuracy becomes poorer. For example, if the matching accuracy is on the 1-pixel basis while the pixel pitch is 1.4 μm, the smallest detectable parallax Δd is 1.4 μm. Where the distance Z to the subject is 1 m, the distance B between the apertures is 5 mm, and the focal length f is 5 mm, the position estimation accuracy ΔZ is about 5.6 cm.

Next, an image processing method to be implemented when a distance is estimated from parallax images is described.

As an image matching process to determine corresponding points between parallax images and calculate a parallax difference, a known template matching method can be employed, for example. By the template matching method, the similarities and differences between two images are examined (reference: Digital Image Processing, supervised by the Editing Committee of Digital Image Processing, published by CG-ARTS Society). When a corresponding point is determined with precision, the similarities and differences obtained from the respective pixels are interpolated with continuous fitting functions or the like, and the sub-pixel positions that provide the saddle points of the fitting functions are then determined. In this manner, the corresponding point can be determined with even higher precision. These are known techniques (reference: Digital Image Processing, edited by the Editing Committee of Digital Image Processing, published by CG-ARTS Society).

As described so far, according to this embodiment, the range resolution can be improved, and a thinner structure can be realized.

Also, according to this embodiment, an image formed through the ring-like incident aperture in each pixel block below the microlenses also has a ring-like shape, and light beams from two or more viewpoints having aperture distances from one another are processed. In this manner, the separation performance for multi-parallax images is improved.

(Second Embodiment)

Figure 8:
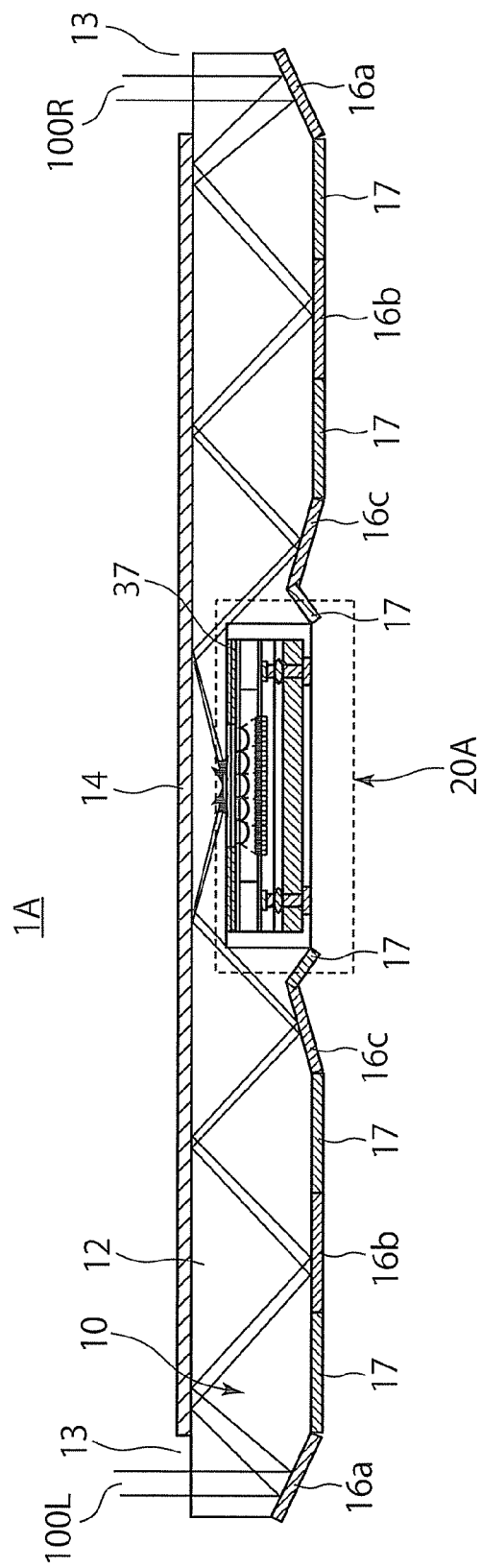
FIG. 8 is a cross-sectional view of a solid-state imaging device of a second embodiment.
Figure 9:
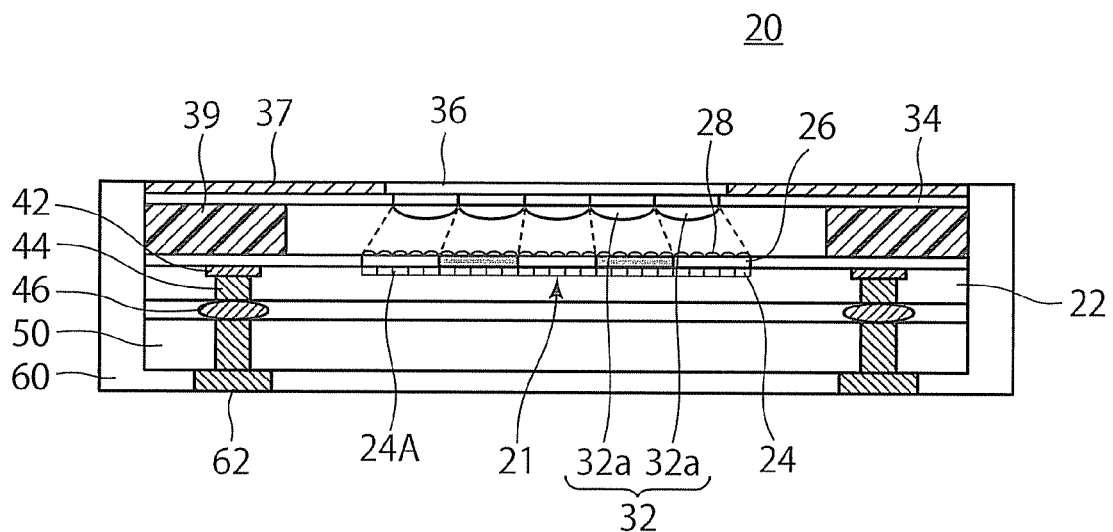
FIG. 9 is a cross-sectional view of an imaging element module of the second embodiment.

FIG. 8 shows a solid-state imaging device according to a second embodiment, and FIG. 9 shows an imaging element module included in the solid-state imaging device.

The solid-state imaging device 1A of the second embodiment has the same structure as the solid-state imaging device 1 shown in FIG. 1, except that the imaging element module 20 is replaced with an imaging element module 20A shown in FIG. 9. The imaging element module 20A has the same structure as the imaging element module 20 shown in FIG. 2, except that the visible light reflection layer 38 is replaced with a stray light absorption layer 37.

In the solid-state imaging device 1A of the second embodiment having the above structure, light that enters the imaging device 1A from a subject is reflected only by the flat reflector 14 and the reflectors 16a, 16b, and 16c in the imaging process, and then enters the imaging element module 20A. In this case, reflection of stray light other than desired light beams is prevented. Accordingly, the stray light that enters the areas other than the incident window leading into the imaging element module 20A (the area in which the transmission layer 36 is formed) is absorbed by the stay light absorption layer 37.

The stray light absorption layer 37 is a layer that has been subjected to non-reflection or low-reflection black-color processing. The stray light absorption layer 37 is formed by a coating material or the like in which a black pigment or the like is dispersed in a dispersing medium having almost the same refractive index as the matrix of the transmission material. It should be noted that the visible light absorption member 17 described in the first embodiment can be made of the same material as the stray light absorption layer 37.

In this embodiment, the range resolution can also be improved, and a thinner structure can be realized, as in the first embodiment.

Also, according to this embodiment, an image formed through the ring-like incident aperture in each pixel block below the microlenses also has a ring-like shape, and light beams from two or more viewpoints having aperture distances from one another are subjected to processing. In this manner, the separation performance for multi-parallax images is improved.

(Third Embodiment)

Figure 10:
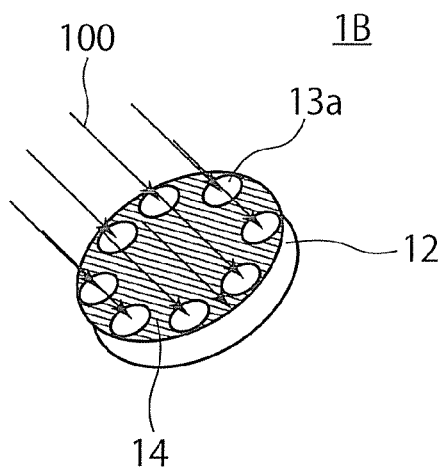
FIG. 10 is a perspective view of a solid-state imaging device of a third embodiment.

Referring now to FIG. 10, a solid-state imaging device according to a third embodiment is described. FIG. 10 is a perspective view of a solid-state imaging device 1B according to the third embodiment. The solid-state imaging device 1B of the third embodiment differs from the solid-state imaging device shown in FIG. 1 or FIG. 3 only in the aperture. Instead of the single ring-like aperture of the first embodiment, more than one aperture 13a is formed on the first surface of the visible light transmission member 12 in the third embodiment, and each of the apertures 13a has a round shape. The apertures 13a are circumferentially arranged. Subject light beams from respective viewpoints enter from those apertures 13a.

Figure 11:
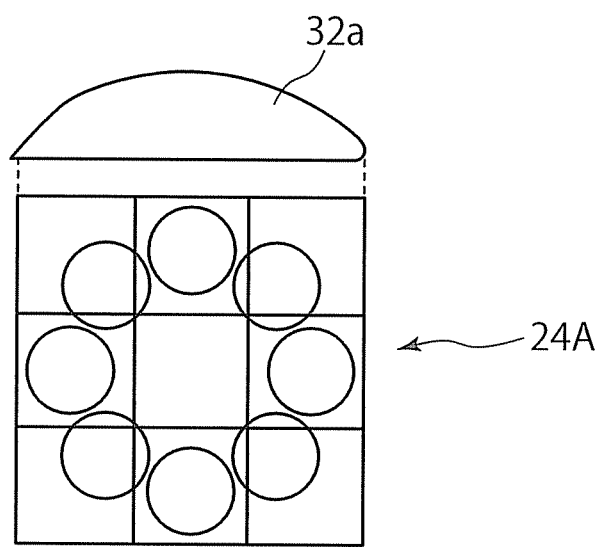
FIG. 11 is a diagram for explaining an image that has passed through a microlens in the third embodiment.

Light from the same subject enters from the apertures 13a formed in the outer circumference of a reflection-type imaging lens, and is guided as light beams with parallaxes to the pixels in the corresponding pixel blocks by the respective microlenses. The distribution of the incident light beams to the pixels 24 is realized by the differences in incident angle with respect to the microlenses, and the differences in incident angle with respect to the microlenses reflect the range information. The light intensity distribution formed in each pixel block exhibits shapes similar to the apertures of the first imaging lens, and the same number of light spots as the number of the apertures is formed, as shown in FIG. 11. For example, if eight apertures are formed in the outer circumference of the first imaging lens as shown in FIG. 10, eight light spots below the microlens 32a are circumferentially arranged as shown in FIG. 11.

In the third embodiment, the range resolution can also be improved, and a thinner structure can be realized, as in the first embodiment.

(Fourth Embodiment)

Figure 12:
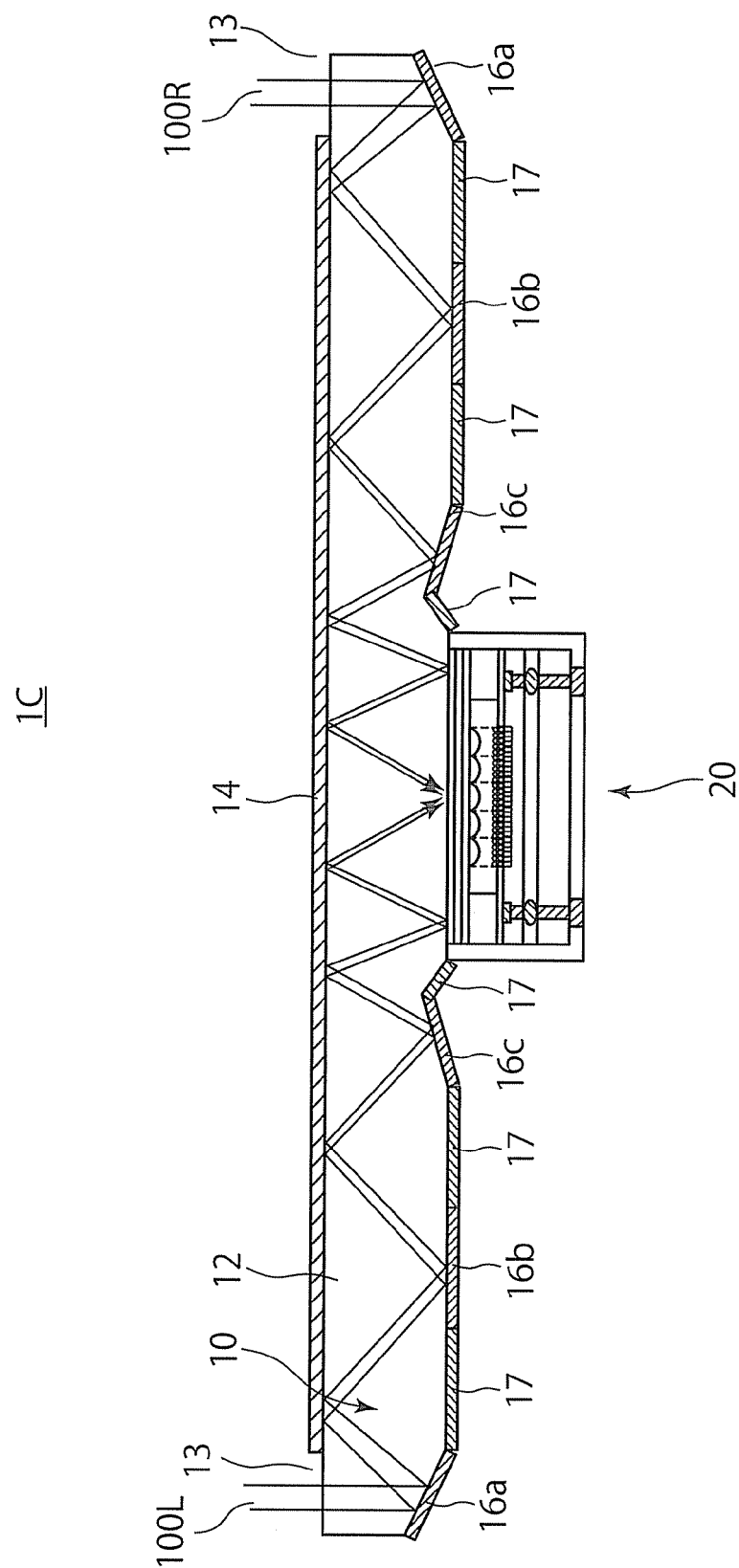
FIG. 12 is a cross-sectional view of a solid-state imaging device of a fourth embodiment.

FIG. 12 shows a solid-state imaging device according to a fourth embodiment. The solid-state imaging device 10C of the fourth embodiment has the same structure as the solid-state imaging device of the first embodiment shown in FIG. 1, except that the imaging element module 20 is not buried in the visible light transmission member 12, but is bonded to the second surface of the first imaging optical system 10.

With this arrangement, there is no need to form the concave portion to bury the imaging element module 20 in the visible light transmission member 12, and the processing of the return optical lens becomes easier.

In the fourth embodiment, the range resolution can also be improved, and a thinner structure can be realized, as in the first embodiment.

Also, according to this embodiment, an image formed through the ring-like incident apertures in each pixel block below the microlenses also has a ring-like shape, and light beams from two or more viewpoints having apertures distances from one another are subjected to processing. In this manner, the separation performance for multi-parallax images is improved.

As described above, according to each of the embodiments, a reflection-type optical system is used as the imaging optical system. With this arrangement, the optical system can be made thinner even if the optical system has a long focal length to improve the range resolution. Although a reflection-type optical system tends to have a large lens aperture, an increase in lens aperture contributes to improvement of the range resolution. Accordingly, a thinner camera with higher precision can be obtained. Also, a reflection-type optical system is characteristically capable of forming images with smaller chromatic aberrations. Accordingly, the accuracy of searching for corresponding points in image processing of parallax images is improved, contributing to higher accuracy of range resolution.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A solid-state imaging device comprising:
an imaging optical system including: a first and second surfaces facing each other; a flat reflector provided on the first surface and having an aperture in an outer circumferential portion, the flat reflector having a circular plate-like shape; and a plurality of reflectors provided on the second surface and located in a plurality of ring-like areas, each of the reflectors being inclined in a radial direction, the reflectors having different diameters from one another, light entering from a subject through the aperture being reflected between the flat reflector and the plurality of reflectors, the light being transmitted toward a center portion of the imaging optical system, the light forming an image at the center portion; and
an imaging element module including: an imaging element comprising an imaging area having a plurality of pixel blocks each including a plurality of pixels, and receiving and converting light from the imaging optical system into image data; a visible light transmission substrate provided between the imaging optical system and the imaging element; a microlens array provided on a surface of the visible light transmission substrate on the imaging element side, and including a plurality of microlenses corresponding to the pixel blocks; and an image processing unit processing the image data obtained by the imaging element, the imaging element module being provided at the center portion of the second surface of the imaging optical system.

2. The device according to claim 1, wherein the imaging optical system further includes a visible light transmission member that is provided between the flat reflector and the plurality of reflectors, and transmits the light.

3. The device according to claim 2, wherein the imaging element module is buried in the visible light transmission member.

4. The device according to claim 2, wherein the imaging element module is provided to be in contact with the second surface.

5. The device according to claim 1, wherein the aperture is a single aperture and has a ring-like shape.

6. The device according to claim 1, wherein the aperture is formed of a plurality of apertures.

7. The device according to claim 1, wherein the imaging element module further includes a visible light reflection layer that is formed in an area other than the area having the microlens array formed therein, the visible light reflection layer being provided on a surface on the opposite side of the visible light transmission substrate from the imaging element.

8. The device according to claim 1, wherein the imaging element module further includes a visible light absorption layer that is formed in an area other than the area having the microlens array formed therein, the visible light absorption layer being provided on a surface on the opposite side of the visible light transmission substrate from the imaging element.

* * * * *